(12) United States Patent
Beyor

(10) Patent No.: US 9,039,348 B1
(45) Date of Patent: May 26, 2015

(54) OPEN CORE CONTINUOUS HELICAL FIN MARINE DRIVE SYSTEM

(71) Applicant: James Philip Beyor, Gulfport, FL (US)

(72) Inventor: James Philip Beyor, Gulfport, FL (US)

( * ) Notice: Subject to any disclaimer, the term of this patent is extended or adjusted under 35 U.S.C. 154(b) by 0 days.

(21) Appl. No.: 14/549,033

(22) Filed: Nov. 20, 2014

Related U.S. Application Data

(60) Provisional application No. 61/921,396, filed on Dec. 27, 2013.

(51) Int. Cl.
| | | |
|---|---|---|
| *B63H 21/34* | (2006.01) | |
| *B63H 1/12* | (2006.01) | |
| *B63H 1/28* | (2006.01) | |
| *B63H 21/38* | (2006.01) | |
| *F01P 3/20* | (2006.01) | |

(52) U.S. Cl.
CPC ............... *B63H 21/34* (2013.01); *B63H 1/12* (2013.01); *B63H 1/28* (2013.01); *B63H 21/383* (2013.01); *B63H 21/386* (2013.01); *F01P 3/207* (2013.01); *B63H 2001/127* (2013.01)

(58) Field of Classification Search
CPC ............ B63H 1/12; B63H 1/16; B63H 1/265; B63H 1/28; B63H 2001/127; B63H 21/34; B63H 21/38; B63H 21/165; F01P 3/20; F01P 3/202; F04D 29/547; F04D 29/566
See application file for complete search history.

(56) References Cited

U.S. PATENT DOCUMENTS

| | | | | |
|---|---|---|---|---|
| 2,598,207 | A * | 5/1952 | Bailey et al. | ................ 251/61.1 |
| 5,181,868 | A * | 1/1993 | Gabriel | ........................ 440/38 |
| 7,470,105 | B2 * | 12/2008 | de Oliveira | .................... 415/77 |

* cited by examiner

*Primary Examiner* — Edward Look
*Assistant Examiner* — Juan G Flores

(57) ABSTRACT

An open core continuous helical fin marine drive system for use with surface and subsurface marine vessels has a cylindrical fluid container nested within a nacelle enclosure having an intake port and an exhaust port tailpipe. The cylindrical fluid container is driven by a fluid container drive motor through a gear assembly including a pinion gear connected to the fluid container drive motor and an underwater ring gear connected to the cylindrical fluid container. A plurality of continuous helical fins connected along the inner wall of the cylindrical fluid container is positioned about a hollow center core and creates a horizontal centripetal fluid vortex thread along the hollow center core as the cylindrical fluid container rotates. An inflatable marine bladder is positioned aft of the cylindrical fluid container and can be engaged to an inflated configuration in order to compress the exiting water flow through the exhaust port tailpipe.

20 Claims, 10 Drawing Sheets

OPEN CORE CONTINUOUS HELICAL FIN MARINE DRIVE SYSTEM

The current application claims a priority to the U.S. Provisional Patent application Ser. No. 61/921,396 filed on Dec. 27, 2013.

FIELD OF THE INVENTION

The present invention relates generally to marine propulsion. More specifically, the present invention is a drive system for surface and subsurface marine vessels that utilizes an open core helical fin design to generate a horizontal centripetal fluid vortex thread.

BACKGROUND OF THE INVENTION

Propeller based marine drive systems, the current standards in marine propulsion, are universally acknowledged to be extremely inefficient primarily because they work against nature. Bladed marine drive systems with friction laden center shafts waste horsepower by destroying the hydrostatic bonds of the water, and then they push against the air infused "soft" water to propel the vessel forward requiring extreme revolutions per minute (RPM) output. This inefficient traction is no different than car tires spinning in soft sand or mud. These inefficiencies waste energy and fuel, and unnecessarily increases carbon emissions. Propeller based marine drive systems are very heavy and complex systems and are therefore expensive to purchase, operate, and maintain. They produce "wasted energy" wakes, which erode shorelines and their blades injure marine creatures.

Since the invention of the propeller, most innovations in the field of marine propulsion have been merely variations of the propeller or screw drive systems, which are bladed systems with a center drive shaft. The most recent innovations introduce the concept of multiple propellers or of counter rotating vanes. Even the contained ribbon drive systems are variations of the bladed systems with center shafts. A marine drive system that works with the water and not against it would be a significant improvement over propeller based bladed drive systems with a center drive shaft. More specifically, a marine drive system wherein all four energy dynamic principals are used to create increased energy efficiency.

Therefore it is an object of the present invention to provide a hybrid marine drive system that uses the full energy harmonics associated with the hydrodynamics of the water offering energy efficiency that cannot be achieved with current marine drive systems. By reducing overall drive system weight, friction and cavitation, the present invention will increase fuel efficiency and decrease associated carbon emissions. The simple design will reduce acquisition, maintenance and repair costs. The design of the present invention induces a diminished wake, resulting in a lesser negative impact on the fragile shoreline environment. Additionally, the deep recessed non-bladed design will not harm sea creatures. It is a primary objective of the present invention to use water as a "partner" in propulsion using the principals of advanced slip stream dynamics. By meeting this objective, the present invention will provide an affordable, fuel efficient and environmentally friendly alternative to current marine drive systems.

The present invention takes advantage of the basic four principles of an object moving in any medium (in this instance water). The four basic principles being active force, passive force, neutral but static force, and the neutralizing of all forces. As the present invention travels through the static mass having a latent neutral force (molecular water bonds), a potential active force flow is created. This potential active force flow is then used to create both a centrifugal force and a divergent neutralizing force within the forward moving flow. As the incoming mass gains speed, the incoming mass is then directed into a neutralized or a free flowing center equal to the stack pressure flow. This active/passive charge is then propelled inward by the balanced suction of both static head and centrifugal push, creating a neutralizing continuous flow or centripetal force, or vortex thread, in the exhaust transitional field greater than the liquid adhesive bonds holding the forward moving vessel back.

SUMMARY OF THE INVENTION

The present invention is a simple, lightweight, high flow hydraulic marine drive system that creates, utilizes and maintains a horizontal fluid vortex. By maintaining the integrity of the hydrostatic bonds of the water, the present invention uses the full spectrum of the potential and kinetic energy as a partner in propulsion to move a vessel through the water.

The propelling means of the present invention consists of a plurality of continuous helical fins fixed to the inner wall of a rotating cylindrical fluid container about a hollow center core. A critical element of the present invention is that the pitch and the frequency of the undulation of each of the plurality of continuous helical fins are constant along the horizontal length of the plurality of continuous helical fins. A second critical element of the present invention is that there is no center drive shaft, wherein the plurality of continuous helical fins are mounted inside the rotating cylindrical fluid container juxtaposed to the hollow center core or canal. The hollow center core is present from the recessed front intake opening of the cylindrical fluid container straight through to the recessed back exhaust opening of the rotating cylindrical fluid container. The hollow center core is a critical element necessary to the formation of a horizontal fluid vortex compression thread, as this configuration channels the water from the open intake port to the exhaust port unimpeded along the smooth surface of the plurality of continuous helical fins inside the containment chamber called the nacelle.

When a matched set of two, counter-rotating drive units are mounted to a hull and immersed in the water, a small engine, coupled with a high flow hydraulic pump, rotates the cylindrical fluid container, the compression decompression chamber, within the nacelle enclosure of each drive unit, causing water to be drawn in through the front opening of the nacelle enclosure, initiating the forward momentum of the vessel. The rotation causes the water to be centrifugally forced away from the hollow center core, against and along the sleek flat surface of the plurality of continuous helical fins, creating a torque rich horizontal centripetal vortex thread. The hollow core of the horizontal fluid vortex produced by the present invention is similar to the hollow center as water flows down a drain due to the Coriolis force. The uniform rotation of the plurality of continuous helical fins of the present invention takes advantage of the slipstream of hull dynamics, and is similar to the undulations a dolphin uses to propel itself through the water. As the vessel continues to move forward, the viscosity of the water in the horizontal centripetal fluid vortex thread exerts a pulling force on the water ahead of it. Simultaneously, the water flowing out of the back opening pushes against the static water in the fluid medium resulting in the suction necessary for the forward movement of a vessel through the water using pull-push propulsion dynamics.

The present invention does not waste energy destroying the molecular integrity of the water and therefore requires less horsepower and therefore less fuel to initiate and maintain forward momentum. Because the present invention maintains the integrity of the water, it produces only a minimal wake and is therefore less damaging to fragile marine shoreline environments. Additionally, the present invention eliminates heavy friction laden inboard drive components such as torque converters, bulky gear driven transmissions with hundreds of moving parts, couplings, through hull drive shafts, stuffing boxes, and heavy water beating propellers. The present invention also eliminates heavy, expensive, excessive horsepower outboard motors. The elimination of these components will significantly decrease drive system weight and friction, which will further increase fuel efficiency. Less wasted fuel means lower operating costs and decreased carbon based emissions. The recessed non-bladed design of the present invention will prevent many of the entanglement issues encountered with the current shaft driven, bladed marine drive systems. In addition, the compact nature of the drive system of the present invention can be mounted anywhere and will free up a tremendous amount of wasted hull space making it available for more functional uses.

DETAIL DESCRIPTIONS OF THE INVENTION

Figure 1:
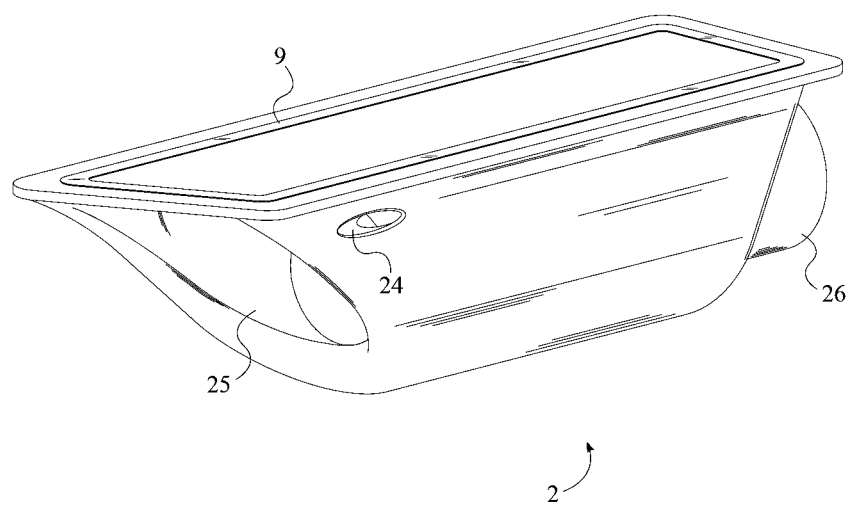
FIG. 1 is a top perspective view of the present invention.

All illustrations of the drawings are for the purpose of describing selected versions of the present invention and are not intended to limit the scope of the present invention.
The present invention is an open core continuous helical fin marine drive system for use with surface and subsurface marine vessels. The present invention comprises a cylindrical fluid container 1, a nacelle enclosure 2, a fluid container drive motor 3, and an inflatable marine bladder 6. The cylindrical fluid container 1 provides the propulsion of the present invention by generating a horizontal centripetal fluid vortex thread and comprises a plurality of continuous helical fins 10 and a hollow center core 13. The fluid container drive motor 3 drives the cylindrical fluid container 1, while the inflatable marine bladder 6 can be utilized to manipulate the horizontal centripetal fluid vortex thread to provide additional torque. The nacelle enclosure 2 provides a housing for the cylindrical fluid container 1, the fluid container drive motor 3, and the inflatable marine bladder 6.

Figure 2:
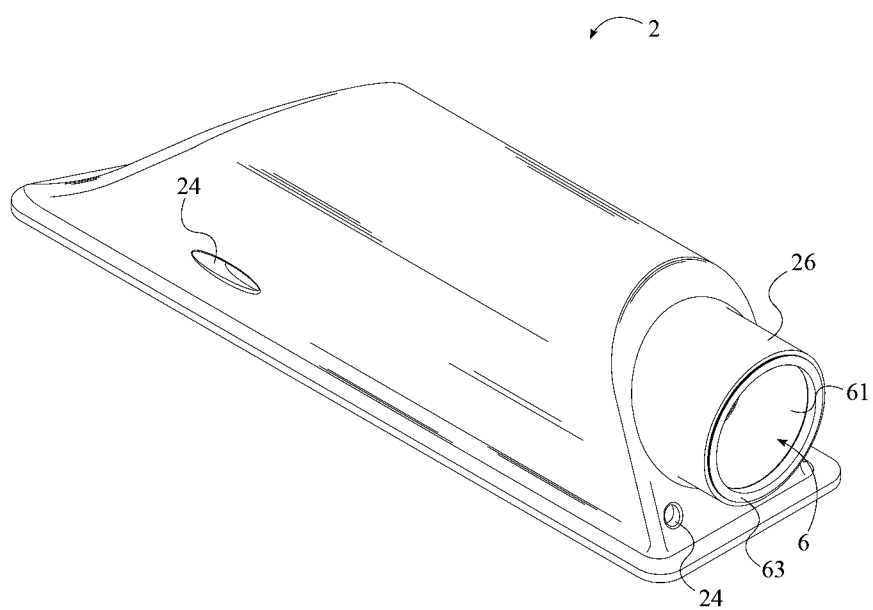
FIG. 2 is a bottom perspective view of the present invention.

In reference to FIG. 1-2, the nacelle enclosure 2 is streamlined and specially designed to reduce waterborne friction. The nacelle enclosure 2 can be constructed from any suitable materials, including but not limited to, impact resistant fiberglass, recyclable polycarbonate, resin, composite polymer, or high strength plastic. For more extreme conditions, the nacelle enclosure 2 can be cast in stainless steel, aluminum, or any other non-corrosive material that can be tailored to the present invention and is rigid enough to withstand water pressures at the desired usage depths. Similarly, the cylindrical fluid container 1 can be constructed from any number of materials, including but not limited to, marine grade stainless steel, annealed aluminum, high strength plastic, or any other non-corrosive material that can be tailored to the present invention and is rigid enough to withstand water pressures at the desired usage depths.

Figure 8:
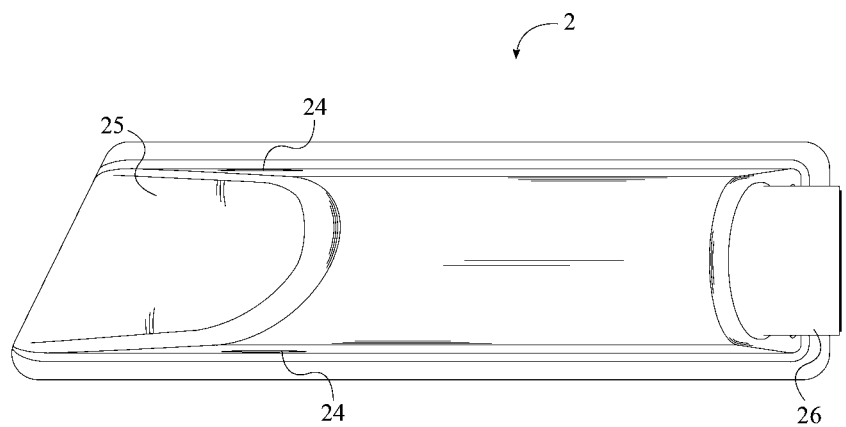
FIG. 8 is a bottom plan view of the present invention.

In further reference to FIG. 1-2, the nacelle enclosure 2 comprises an intake port 25 and an exhaust port tailpipe 26, wherein water flows through the present invention from the intake port 25 to the exhaust port tailpipe 26. The cylindrical fluid container 1 is rotatably mounted within the nacelle enclosure 2 and is coaxially positioned in between the intake port 25 and the inflatable marine bladder 6, wherein rotation of the cylindrical fluid container 1 generates the horizontal centripetal fluid vortex thread for propelling the vessel. Meanwhile, the inflatable marine bladder 6 is concentrically positioned within the exhaust port tailpipe 26, as shown in FIG. 2, such that the inflatable marine bladder 6 may manipulate the horizontal centripetal fluid vortex thread generated by the cylindrical fluid container 1. In reference to FIG. 1 and FIG. 8, the intake port 25 has a scoop shape to allow for the creation of a constant static pressure build-up of water as the vessel begins to move forward.

Figure 9:
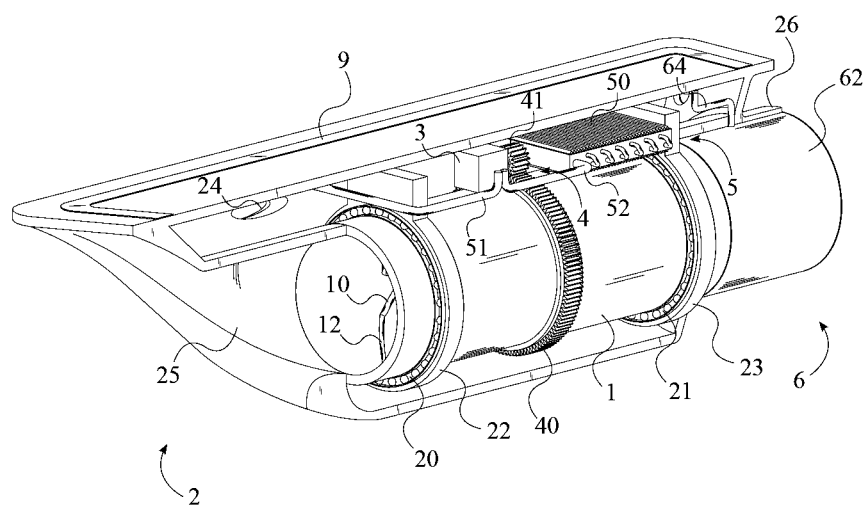
FIG. 9 is a perspective section view of the nacelle enclosure, showing the cylindrical fluid container, the fluid container drive motor, gear assembly, hydraulic cooling system, and inflatable marine bladder.

In reference to FIG. 9, the nacelle enclosure 2 further comprises a first waterproof thrust bearing 20, a second waterproof thrust bearing 21, a first bearing support 22, a second bearing support 23, and a plurality of water cooling vents 24. The first bearing support 22 retains the first waterproof thrust bearing 20, wherein the first waterproof thrust bearing 20 is rotatably positioned within the first bearing support 22, and concentrically aligns the first waterproof thrust bearing 20 with the intake port 25. Likewise, the second bearing support 23 retains the second waterproof thrust bearing 21, wherein the second waterproof thrust bearing 21 is rotatably positioned within the second bearing support 23, and concentrically aligns the second waterproof thrust bearing 21 with the exhaust port tailpipe 26. The cylindrical fluid container 1 is positioned through the first waterproof thrust bearing 20 and the second waterproof thrust bearing 21; the first waterproof thrust bearing 20 and the second waterproof thrust bearing 21 allowing for the rotation of the cylindrical fluid container 1 within the nacelle enclosure 2.

Figure 4:
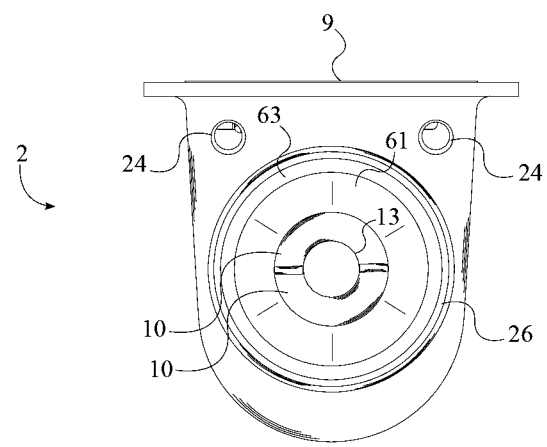
FIG. 4 is a rear elevational view of the present invention.
Figure 5:
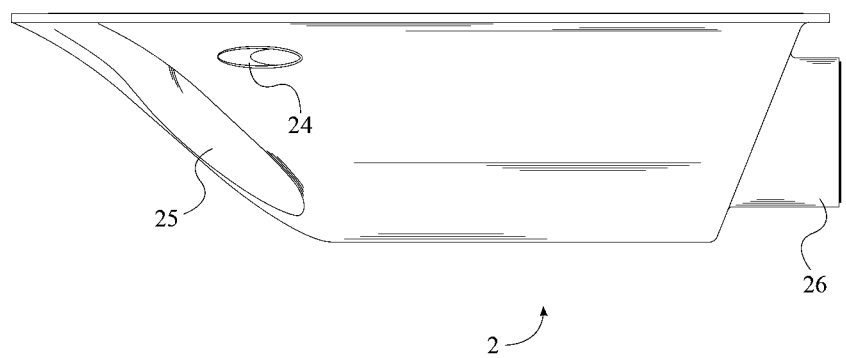
FIG. 5 is a right side elevational view of the present invention.
Figure 6:
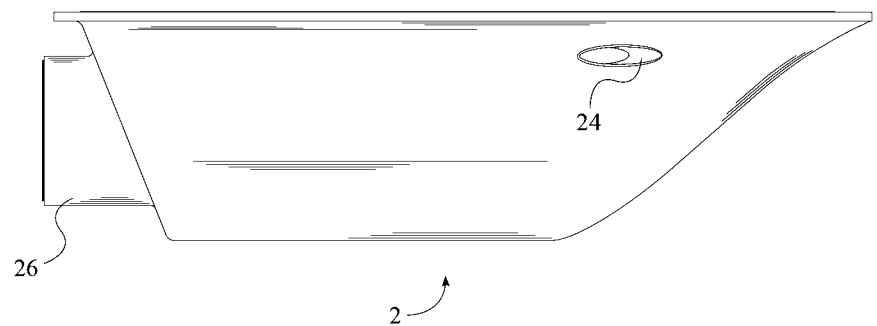
FIG. 6 is a left side elevational view of the present invention.

The plurality of water cooling vents 24 allows water to flow through the nacelle enclosure 2, around the cylindrical fluid container 1 and the fluid container drive motor 3. Each of the plurality of water cooling vents 24 is positioned adjacent to either the intake port 25, as shown in FIG. 5-6, or the exhaust port tailpipe 26, as shown in FIG. 4. In this way, as the vessel to which the present invention is connected is propelled forward, water is able to flow through the nacelle enclosure 2.

Figure 3:
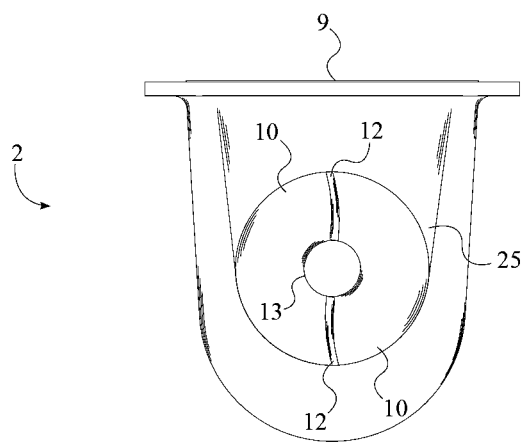
FIG. 3 is a front elevational view of the present invention.
Figure 10:
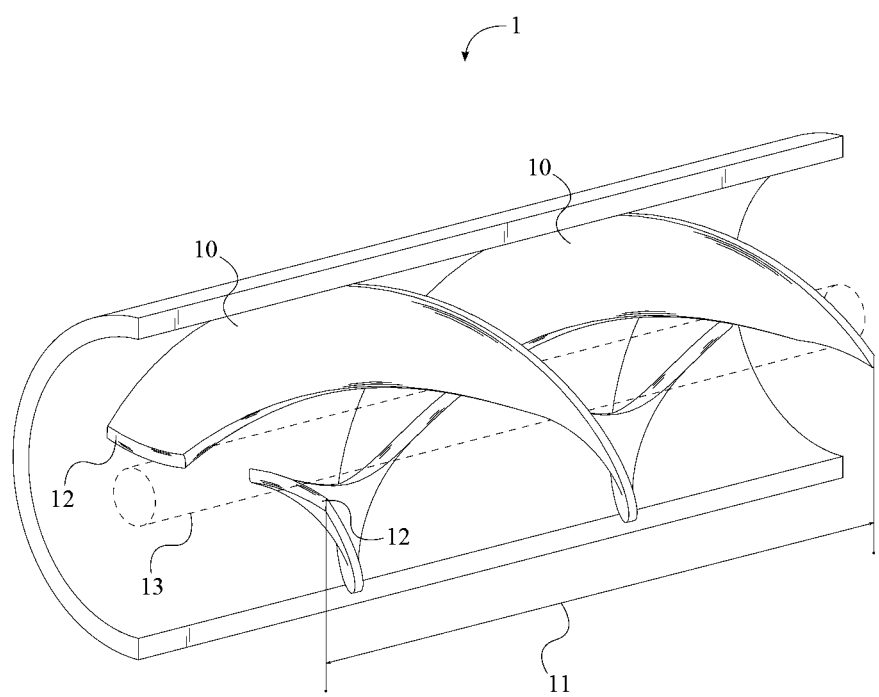
FIG. 10 is a perspective sectional view of the cylindrical fluid container, showing the hollow center core and the single complete undulation for each of the plurality of continuous helical fins.

In reference to FIG. 10 each of the plurality of continuous helical fins 10 is longitudinally positioned within the cylindrical fluid container 1, wherein each of the plurality of continuous helical fins 10 is fixed to the inside wall of the cylindrical fluid container 1. The hollow center core 13 is also longitudinally positioned within the cylindrical fluid container 1, being an open ended channel traversing centrally through the cylindrical fluid container 1, as depicted by FIG. 3-4. The hollow center core 13 is concentrically positioned through the cylindrical fluid container 1, while the plurality of continuous helical fins 10 is positioned radially around the hollow center core 13.

The absence of a center shaft, subsequently resulting in the hollow center core 13, is a critical element of the present invention, which allows for the formation, utilization and cessation of the horizontal centripetal fluid vortex thread, which is the primary motive force of the present invention. As the cylindrical fluid container 1 rotates within the nacelle enclosure 2, the plurality of continuous helical fins 10 generates the horizontal centripetal fluid vortex thread, which then traverses through the cylindrical fluid container 1 along the hollow center core 13. The primary material design consideration for the plurality of continuous helical fins 10 is that each of the plurality of continuous helical fins 10 has a flat slick surface to ensure minimal frictional drag of the water against the surface of each of the plurality of continuous helical fins 10.

In reference to FIG. 10, each of the plurality of continuous helical fins 10 comprises a leading edge 12 and a single complete undulation 11. The leading edge 12 of each of the plurality of continuous helical fins 10 is positioned adjacent to the intake port 25, wherein the leading edge 12 separates the flow of water into the cylindrical fluid container 1. The leading edge 12 also defines the lateral curvature of each of the plurality of continuous helical fins 10 for pushing the water as the cylindrical fluid container 1 rotates. The leading edge 12 is a feature that cannot be overlooked as the leading edge 12 of each of the plurality of continuous helical fins 10 ensures the rapid and efficient intake of water into and through the cylindrical fluid container 1.

In further reference to FIG. 10, the single complete undulation 11 defines one complete turn in each of the plurality of continuous helical fins 10. The critical element of the present invention is that the frequency and pitch of the single complete undulation 11 of each of the plurality of continuous helical fins 10 will remain constant along the horizontal length of the plurality of continuous helical fins 10. In contrast, the length of the plurality of continuous helical fins 10 and the distance between the single complete undulation 11 of each of the plurality of continuous helical fins 10 can vary depending on the size and weight of the vessel for which the present invention is being adapted.

In addition to the length of the plurality of continuous helical fins 10 and the distance between the single complete undulation 11, the length and circumference of the cylindrical fluid container 1, and the exact number of the plurality of continuous helical fins 10 are also dependent upon the size and weight of the vessel to be propelled. For example, larger models of the present invention, for larger marine vessels, will utilize more continuous helical fins as compared to smaller models for smaller marine vessels. Additionally, in larger models for larger marine vessels, the plurality of continuous helical fins 10 will be longer and the cylindrical fluid container 1 will have a larger diameter.

What will remain constant regardless of vessel size and weight is the uniform consistency of the pitch and frequency of the single complete undulation 11 of each of the plurality of continuous helical fins 10 along the horizontal length of the plurality of continuous helical fins 10. This consistency is a critical design of the present invention and is necessary to maintain the horizontal centripetal fluid vortex thread through the cylindrical fluid container 1. Another critical element of the present invention is that each of the plurality of continuous helical fins 10 is positioned within the cylindrical fluid container 1 such that there is an intake transitional field 7 and an exhaust transitional field 8, as shown in FIG. 11.

Figure 11:
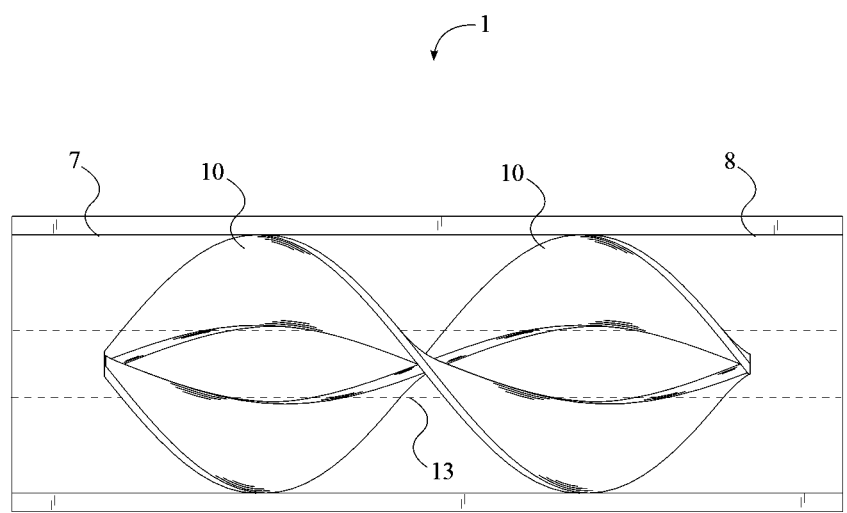
FIG. 11 is a right side sectional view of the cylindrical fluid container, detailing the intake transitional field and the exhaust transitional field positioned about the plurality of continuous helical fins.

In reference to FIG. 11, both the intake transitional field 7 and the exhaust transitional field 8 are internal sections of the cylindrical fluid container 1 having a smooth surface and circular cross section. The intake transitional field 7 is positioned in between the plurality of continuous helical fins 10 and the intake port 25, adjacent to the leading edge 12 of each of the plurality of continuous helical fins 10, while the exhaust transitional field 8 is positioned in between the exhaust port tailpipe 26 and the plurality of continuous helical fins 10 opposite the leading edge 12. The intake transitional field 7 is a functional feature of the design of the present invention, which serves to maintain the static boundary of the water as the water enters the cylindrical fluid container 1. The exhaust transitional field 8 is also a functional feature of the design of the present invention, which allows for the cessation of the horizontal centripetal fluid vortex thread as the horizontal centripetal fluid vortex thread exits the cylindrical fluid container 1 into the inflatable marine bladder 6.

Figure 12:
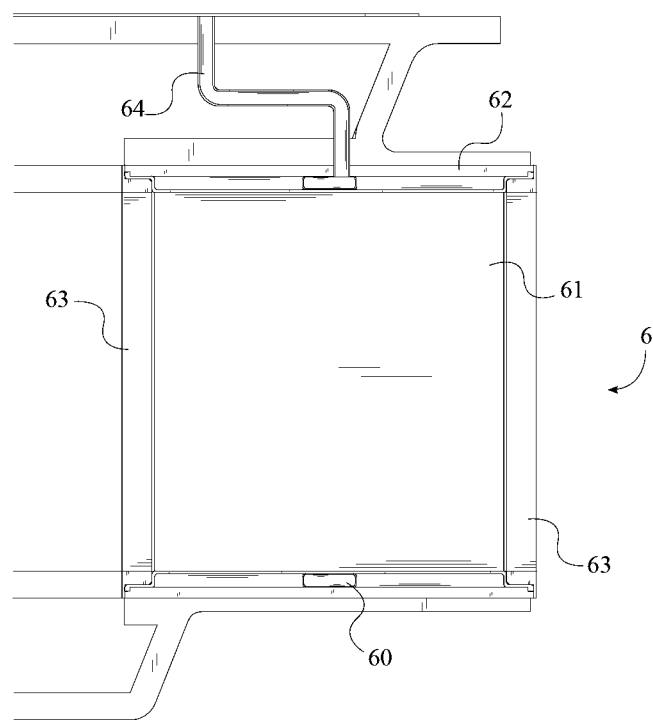
FIG. 12 is a right side sectional view of the inflatable marine bladder in the deflated configuration, wherein the inflatable hydraulic tube is deflated and the marine bladder has a constant radius.
Figure 13:
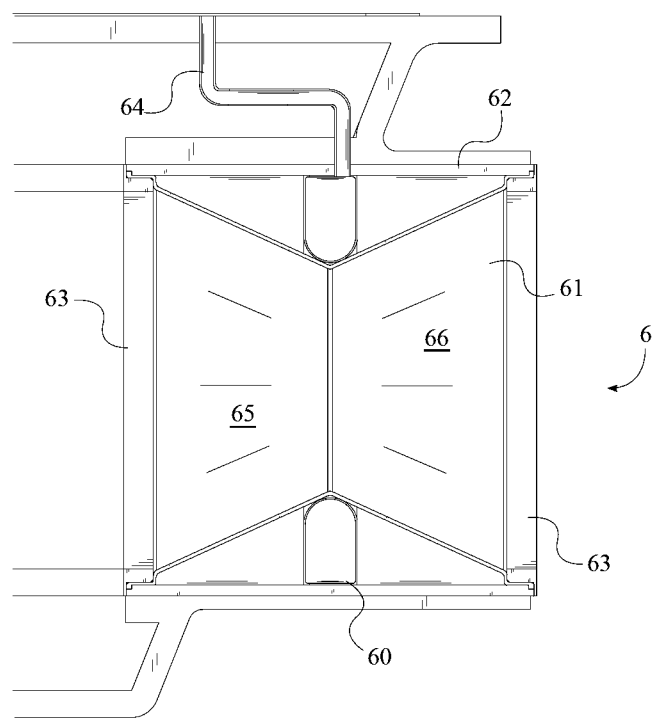
FIG. 13 is a right side sectional view of the inflatable marine bladder in the inflated configuration, wherein the inflatable hydraulic tube is inflated and the marine bladder forms a contraction section and a diffuser section.

In reference to FIG. 12-13, the inflatable marine bladder 6 comprises an inflatable hydraulic tube 60, a bladder liner 61, a hydraulic bladder fill line 64, a marine bladder outer containment case 62, and a pair of bladder seal rings 63. The inflatable marine bladder 6 is a critical component of the present invention that is used to compress the horizontal centripetal fluid vortex thread when additional torque is required, such as when the present invention is activated to initially propel a vessel. The inflatable marine bladder 6 has an inflated configuration, as shown in FIG. 13, and a deflated configuration, as shown in FIG. 12, wherein the inflated configuration is utilized for instances requiring increased torque and the deflated configuration is utilized during normal operation of the present invention. The bladder liner 61 features embedded staves, which act to structurally support the bladder liner 61 when the inflatable marine bladder 6 is in the inflated configuration.

The inflatable hydraulic tube 60 is positioned in between the bladder liner 61 and the nacelle enclosure 2, wherein the inflatable hydraulic tube 60 can be inflated or deflated in order to manipulate the bladder liner 61. The manipulation of the bladder liner 61 effectively allows the cross sectional area of the exhaust port tailpipe 26 to be adjusted. In reference to FIG. 12, when the inflatable marine bladder 6 is in the deflated configuration, the inflatable hydraulic tube 60 is deflated such that the bladder liner 61 has a constant radius through the exhaust port tailpipe 26. In reference to FIG. 13, when the inflatable marine bladder 6 is in the inflated configuration, the inflatable hydraulic tube 60 is inflated such that the bladder liner 61 forms a contraction section 65 and a diffuser section 66; the contraction section 65 tapering away from the cylindrical fluid container 1 and the diffuser section 66 tapering towards the cylindrical fluid container 1.

In reference to FIG. 12, the marine bladder outer containment case 62 is a rigid, cylindrical shell that forms the housing of the inflatable marine bladder 6 and is adjacently connected to the nacelle enclosure 2. The bladder liner 61 is positioned within and connected to the marine bladder outer containment case 62, wherein the inflatable hydraulic tube 60 is positioned in between the bladder liner 61 and the marine bladder outer containment case 62. The hydraulic bladder fill line 64 is adjacently connected to inflatable hydraulic tube 60 and is in fluid communication with the inflatable hydraulic tube 60, such that fluid can be pumped into and out of the inflatable hydraulic tube 60 in order to achieve the inflated configuration and the deflated configuration.

In further reference to FIG. 12, each of the pair of bladder seal rings 63 is adjacently connected to the marine bladder outer containment case 62 and serves as an annular end cap about the inflatable marine bladder 6. Each of the pair of bladder seal rings 63 is connected such that the bladder liner 61 is positioned in between the pair of bladder seal rings 63 and the marine bladder outer containment case 62. In this way, the pair of bladder seal rings 63 holds the bladder liner 61 closed, such that water cannot fill in between the bladder liner 61 and the marine bladder outer containment case 62, which would compromise the functionality of the inflatable marine bladder 6.

In reference to FIG. 9, the cylindrical fluid container 1 is torsionally connected to the fluid container drive motor 3 through a gear assembly 4, wherein the fluid container drive motor 3 drives the cylindrical fluid container 1. The gear assembly 4 comprises an underwater ring gear 40 and a pinion gear 41; the underwater ring gear 40 being positioned about the outer surface of the cylindrical fluid container 1 and the pinion gear 41 being operatively coupled to the fluid container drive motor 3. The underwater ring gear 40 is perimetrically connected to the cylindrical fluid container 1 opposite the plurality of continuous helical fins 10. The pinion gear 41 is rotatably connected to the fluid container drive motor 3 and engages the underwater ring gear 40, such that rotation of the pinion gear 41 drives the rotation of the cylindrical fluid container 1. In the preferred embodiment of the present invention, the fluid container drive motor 3 is a hydraulic motor, however, other motor types may be utilized in other embodiments of the present invention.

In further reference to FIG. 9, the present invention also features a hydraulic cooling system 5 for cooling the oil used by the onboard engine powering the fluid container drive motor 3. The hydraulic cooling system 5 comprises an at least one heat exchanger 50, a hydraulic intake cooling line 51, and a hydraulic outtake cooling line 52. The hydraulic intake cooling line 51 and the hydraulic outtake cooling line 52 are adjacently connected to the at least one heat exchanger 50, wherein the hydraulic intake cooling line 51 and the hydraulic outtake cooling line 52 are in fluid communication with the at least one heat exchanger 50. In the preferred embodiment of the present invention, the at least one heat exchanger 50 is a finned heat exchanger in order to provide increased surface area for dissipating heat from the oil flowing through the at least one heat exchanger 50.

The hydraulic intake cooling line 51 feeds oil into the at least one heat exchanger 50 from the onboard engine. As the vessel is propelled by the present invention, water flows through the plurality of water cooling vents 24, passing the at least one heat exchanger 50. As the oil passes through the at least one heat exchanger 50, heat from the oil is dissipated into the water flowing through the nacelle enclosure 2. The cooled oil then travels through the hydraulic outtake cooling line 52, where the oil is fed back into the onboard engine. As the vessel continues to travel, the heated water within the nacelle enclosure 2 exits the plurality of water cooling vents 24 as fresh, cooler water is brought in. The hydraulic intake cooling line 51 and the hydraulic outtake cooling line 52 can be connected to any inboard engine with a front or rear mounted high flow hydraulic pump.

If the fluid container drive motor 3 is a hydraulic motor, then the fluid container drive motor 3 can be integrated into the hydraulic cooling system 5, such that both are connected to the same inboard engine. In such a case, the fluid container drive motor 3 is adjacently connected to either the hydraulic intake cooling line 51 or the hydraulic outtake cooling line 52, wherein the fluid container drive motor 3 is in fluid communication with either the hydraulic intake cooling line 51 or the hydraulic outtake cooling line 52. Ideally, the fluid container drive motor 3 would be connected to the hydraulic intake cooling line 51, as extra heat produced by the fluid container drive motor 3 would then be dissipated through the at least one heat exchanger 50.

Figure 7:
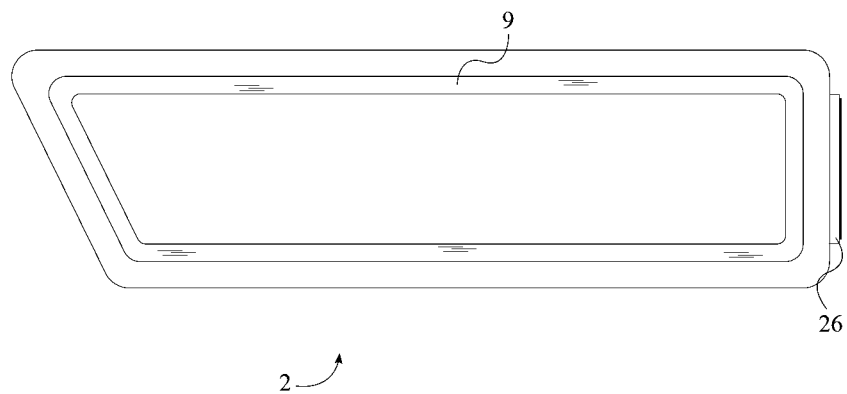
FIG. 7 is a top plan view of the present invention.

In reference to FIG. 7, the present invention further comprises a nacelle gasket 9. The nacelle gasket 9 is positioned into the nacelle enclosure 2 opposite the cylindrical fluid container 1, wherein the nacelle gasket 9 is positioned in between the nacelle enclosure 2 and the hull of the vessel to which the present invention is connected. The nacelle gasket 9 serves as a vibration damper between the hull of the vessel and the nacelle enclosure 2, absorbing and dissipating vibrations produced from the cylindrical fluid container 1 as the cylindrical fluid container 1 is rotated within the nacelle enclosure 2. The nacelle gasket 9 can be constructed from high density marine grade rubber, or any other suitable material having the desired vibration dampening properties.

When mounted to a vessel, the present invention is fully submerged underwater, wherein the cylindrical fluid container 1 is filled with water. With the introduction of a minimal amount of start-up energy from a small engine, coupled with the fluid container drive motor 3, the cylindrical fluid container 1 with the plurality of continuous helical fins 10 begins to rotate. The intake transitional field 7 allows the water, under pressure, to be pulled into the cylindrical fluid container 1 and compressed against the smooth inner surface of the plurality of continuous helical fins 10. This compression of water against the plurality of continuous helical fins 10 initiates the horizontal centripetal fluid vortex thread through the cylindrical fluid container 1. As the cylindrical fluid container 1 continues to rotate, the water tightens into a spiral, due to the centrifugal principals of the rotation and the hydrostatic nature of the molecular bonds of water, creating a stable, sustainable, low revolutions per minute, torque rich horizontal centripetal fluid vortex thread. The centrifugal force of the water against the inner surface of the plurality of continuous helical fins 10 will build a rotational flow dynamic rearward, leaving a horizontally oriented suction through the column of exiting water traveling through the hollow center core 13 of the cylindrical fluid container 1. This horizontal suction through the stream of water traveling along the hollow center core 13 is similar to the hollow vertical core formed as water falls down a drain.

Once sufficient forward speed is achieved and maintained by the present invention, the horizontal centripetal fluid vortex thread creates a rearward proportional hydraulic density equal to the forward propulsion. In reference to FIG. 13, if additional thrust is needed during the start-up phase, then the inflatable marine bladder 6 can be engaged into the inflated configuration to add temporary thrust by compressing the exit flow of water through the exhaust port tailpipe 26. In the inflated configuration, the bladder liner 61 forms the contraction section 65 and the diffuser section 66, wherein the exiting water flow is compressed by the contraction section 65, increasing the velocity of the exit flow through the diffuser section 66.

Once the horizontal centripetal fluid vortex thread is established, the horizontal centripetal fluid vortex thread will extend along the hollow center core 13 of the cylindrical fluid container 1 towards the exhaust transitional field 8. As the vessel continues to move forward, the viscosity of the water in the horizontal centripetal fluid vortex thread exerts a pulling force. Simultaneously, the water flowing out of the exhaust port tailpipe 26 of the nacelle enclosure 2 pushes against the water in the surrounding fluid medium resulting in forward movement of the vessel through the water using pull-push propulsion dynamics. As the vessel continues to move forward, the static pressure dissipates within the exhaust transitional field 8 thus allowing a smooth transition of the pressurized water out the exhaust port tailpipe 26 and back into the surrounding fluid medium from which the water came with minimal disturbance to the water, therefore creating minimal wake and minimal wasted energy.

In its broadest form, the present invention offers a revolutionary new marine drive system that is energy efficient and environmentally friendly. The present invention is a unique drive system for all types of commercial and recreational marine vessels, both surface and subsurface, including utility barges, tankers and scows. The present invention is a user friendly, self-contained unit which is easy to install and easy to remove to facilitate inspection, repair and cleaning. Additionally, the present invention has low purchase, use, and maintenance costs. Furthermore, the present invention solves one of the primary problems associated with the current propeller based marine drive systems by reducing fuel waste and therefore fuel costs. Reduced fuel waste will result in a direct reduction of carbon based greenhouse gas emissions, thus lessening the economic and environmental costs associated with marine propulsion. The present invention may open the door to the future development of submersible transportation vehicles for private and commercial use.

The purpose, size, weight and hull configuration of the marine vessel will determine the exact style and physical dimensions of the component parts of the present invention for maximum performance. Additionally, the current invention can be adapted to electric motors and quiet solar battery drive units.

The foregoing written description of the present invention enables one of ordinary skill to create and use the device in what is considered presently to be the best way possible. There can be variations, equivalents, and combinations of the device, so one should not take the above description as being the only way, or form in which, it can be created. That is, this description is but one representation of what can be done to produce and use the device to perform in the intended manner. The present invention should therefore not be limited by the above described embodiment but include all embodiments and employ all methods available within the scope and spirit of the present invention. It will be understood the present invention may be embodied in other forms without departing from the invention disclosed and that the embodiment described herein is in all respects illustrative and not restrictive.

Although the invention has been explained in relation to its preferred embodiment, it is to be understood that many other possible modifications and variations can be made without departing from the spirit and scope of the invention as hereinafter claimed.

What is claimed is:

1. An open core continuous helical fin marine drive system comprises:
    a cylindrical fluid container comprises a plurality of continuous helical fins and a hollow center core;
    a nacelle enclosure comprises an intake port and an exhaust port tailpipe;
    the plurality of continuous helical fins and the hollow center core being longitudinally positioned within the cylindrical fluid container;
    the plurality of continuous helical fins being radially positioned around the hollow center core;
    the cylindrical fluid container being rotatably mounted within the nacelle enclosure;
    the cylindrical fluid container being torsionally connected to a fluid container drive motor through a gear assembly, wherein the fluid container drive motor drives the cylindrical fluid container;
    an inflatable marine bladder being concentrically positioned within the exhaust port tailpipe; and
    the cylindrical fluid container being coaxially positioned in between the inflatable marine bladder and the intake port.

2. The open core continuous helical fin marine drive system as claimed in claim 1 further comprises:
    the gear assembly comprises an underwater ring gear and a pinion gear;
    the underwater ring gear being perimetrically connected to the cylindrical fluid container opposite the plurality of continuous helical fins;
    the pinion gear being rotatably connected to the fluid container drive motor; and
    the pinion gear engaging the underwater ring gear.

3. The open core continuous helical fin marine drive system as claimed in claim 1 further comprises:
    the nacelle enclosure further comprises a first thrust bearing and a second thrust bearing; and
    the cylindrical fluid container being positioned through the first thrust bearing and the second thrust bearing.

4. The open core continuous helical fin marine drive system as claimed in claim 3 further comprises:
    the nacelle enclosure further comprises a first bearing support and a second bearing support;
    the first thrust bearing being rotatably positioned within the first bearing support; and
    the second thrust bearing being rotatably positioned within the second bearing support.

5. The open core continuous helical fin marine drive system as claimed in claim 1 further comprises:
    the nacelle enclosure comprises a plurality of water cooling vents; and
    the plurality of water cooling vents being positioned adjacent to the intake port and the exhaust port tailpipe.

6. The open core continuous helical fin marine drive system as claimed in claim 1 further comprises:
    each of the plurality of continuous helical fins comprises a single complete undulation;
    the single complete undulation evenly spanning along the cylindrical fluid container; and
    the single complete undulation of each of the plurality of continuous helical fins being of equal length.

7. The open core continuous helical fin marine drive system as claimed in claim 1 further comprises:
    each of the plurality of continuous helical fins comprises a leading edge; and
    the leading edge being positioned adjacent to the intake port.

8. The open core continuous helical fin marine drive system as claimed in claim 1 further comprises:
    an intake transitional field;
    the intake transitional field being positioned within the cylindrical fluid container; and the intake transitional field being positioned in between the plurality of continuous helical fins and the intake port.

9. The open core continuous helical fin marine drive system as claimed in claim 1 further comprises:
an exhaust transitional field;
the exhaust transitional field being positioned within the cylindrical fluid container; and
the exhaust transitional field being positioned in between the plurality of continuous helical fins and the exhaust port tailpipe.

10. The open core continuous helical fin marine drive system as claimed in claim 1 further comprises:
the inflatable marine bladder comprises an inflatable hydraulic tube, a bladder liner, and a hydraulic bladder fill line;
the inflatable hydraulic tube being positioned in between the bladder liner and the nacelle enclosure;
the hydraulic bladder fill line being adjacently connected to the inflatable hydraulic tube; and
the hydraulic bladder fill line and the inflatable hydraulic tube being in fluid communication with each other.

11. The open core continuous helical fin marine drive system as claimed in claim 10 further comprises:
the inflatable hydraulic tube being inflated; and
the bladder liner forming a contraction section and a diffuser section.

12. The open core continuous helical fin marine drive system as claimed in claim 10 further comprises:
the inflatable hydraulic tube being deflated; and
the bladder liner having a constant radius.

13. The open core continuous helical fin marine drive system as claimed in claim 10 further comprises:
the inflatable marine bladder further comprises a marine bladder outer containment case;
the inflatable hydraulic tube being positioned in between the bladder liner and the marine bladder outer containment case; and
the marine bladder outer containment case being adjacently connected to the nacelle enclosure.

14. The open core continuous helical fin marine drive system as claimed in claim 13 further comprises:
the inflatable marine bladder further comprises a pair of bladder seal rings;
the pair of bladder seal rings being adjacently connected to the marine bladder outer containment casement; and
the bladder liner being positioned in between the pair of bladder seal rings and the marine bladder outer containment casement.

15. The open core continuous helical fin marine drive system as claimed in claim 1 further comprises:
a hydraulic cooling system;
the hydraulic cooling system comprises at least one heat exchanger, a hydraulic intake cooling line, and a hydraulic cooling outtake line;
the hydraulic cooling system being positioned within the nacelle enclosure; and
the hydraulic intake cooling line and the hydraulic outtake cooling line being in fluid communication with the at least one heat exchanger.

16. The open core continuous helical fin marine drive system as claimed in claim 1 further comprises:
a nacelle gasket;
the nacelle gasket being adjacently connected to the nacelle enclosure; and
the nacelle gasket being positioned on the nacelle enclosure opposite the cylindrical fluid container.

17. An open core continuous helical fin marine drive system comprises:
a cylindrical fluid container comprises a plurality of continuous helical fins and a hollow center core;
a nacelle enclosure comprises an intake port, an exhaust port tailpipe, a first thrust bearing, a second thrust bearing, a first bearing support, and a second bearing support;
each of the plurality of continuous helical fins comprises a single complete undulation;
the plurality of continuous helical fins and the hollow center core being longitudinally positioned within the cylindrical fluid container;
the plurality undulations evenly spanning along the cylindrical fluid container;
the single complete undulation of each of the plurality of continuous helical fins being of equal length;
the plurality of continuous helical fins being radially positioned around the hollow center core;
the cylindrical fluid container being rotatably mounted within the nacelle enclosure;
the cylindrical fluid container being positioned through the first thrust bearing and the second thrust bearing;
the first thrust bearing being rotatably positioned within the first bearing support;
the second thrust bearing being rotatably positioned within the second bearing support;
the cylindrical fluid container being torsionally connected to a fluid container drive motor through a gear assembly, wherein the fluid container drive motor drives the cylindrical fluid container;
the gear assembly comprises an underwater ring gear and a pinion gear;
the underwater ring gear being perimetrically connected to the cylindrical fluid container opposite the plurality of continuous helical fins;
the pinion gear being rotatably connected to the fluid container drive motor;
the pinion gear engaging the underwater ring gear;
an inflatable marine bladder being concentrically positioned within the exhaust port tailpipe;
the inflatable marine bladder comprises an inflatable hydraulic tube, a bladder liner, and a hydraulic bladder fill line;
the inflatable hydraulic tube being positioned in between the bladder liner and the nacelle enclosure;
the hydraulic bladder fill line being adjacently connected to the inflatable hydraulic tube;
the hydraulic bladder fill line and the inflatable hydraulic tube being in fluid communication with each other; and
the cylindrical fluid container being coaxially positioned in between the inflatable marine bladder and the intake port.

18. The open core continuous helical fin marine drive system as claimed in claim 17 further comprises:
an intake transitional field;
the intake transitional field being positioned within the cylindrical fluid container; and
the intake transitional field being positioned in between the plurality of continuous helical fins and the intake port.

19. The open core continuous helical fin marine drive system as claimed in claim 17 further comprises:
an exhaust transitional field;
the exhaust transitional field being positioned within the cylindrical fluid container; and the exhaust transitional field being positioned in between the plurality of continuous helical fins and the exhaust port tailpipe.

20. The open core continuous helical fin marine drive system as claimed in claim 17 further comprises:

the inflatable marine bladder further comprises a marine bladder outer containment case and a pair of bladder seal rings;

the inflatable hydraulic tube being positioned in between the bladder liner and the marine bladder outer containment case;

the marine bladder outer containment case being adjacently connected to the nacelle enclosure;

the bladder seal ring being adjacently connected to the marine bladder outer containment casement; and the bladder liner being positioned in between the bladder seal ring and the marine bladder outer containment casement.

* * * * *